UNITED STATES PATENT OFFICE.

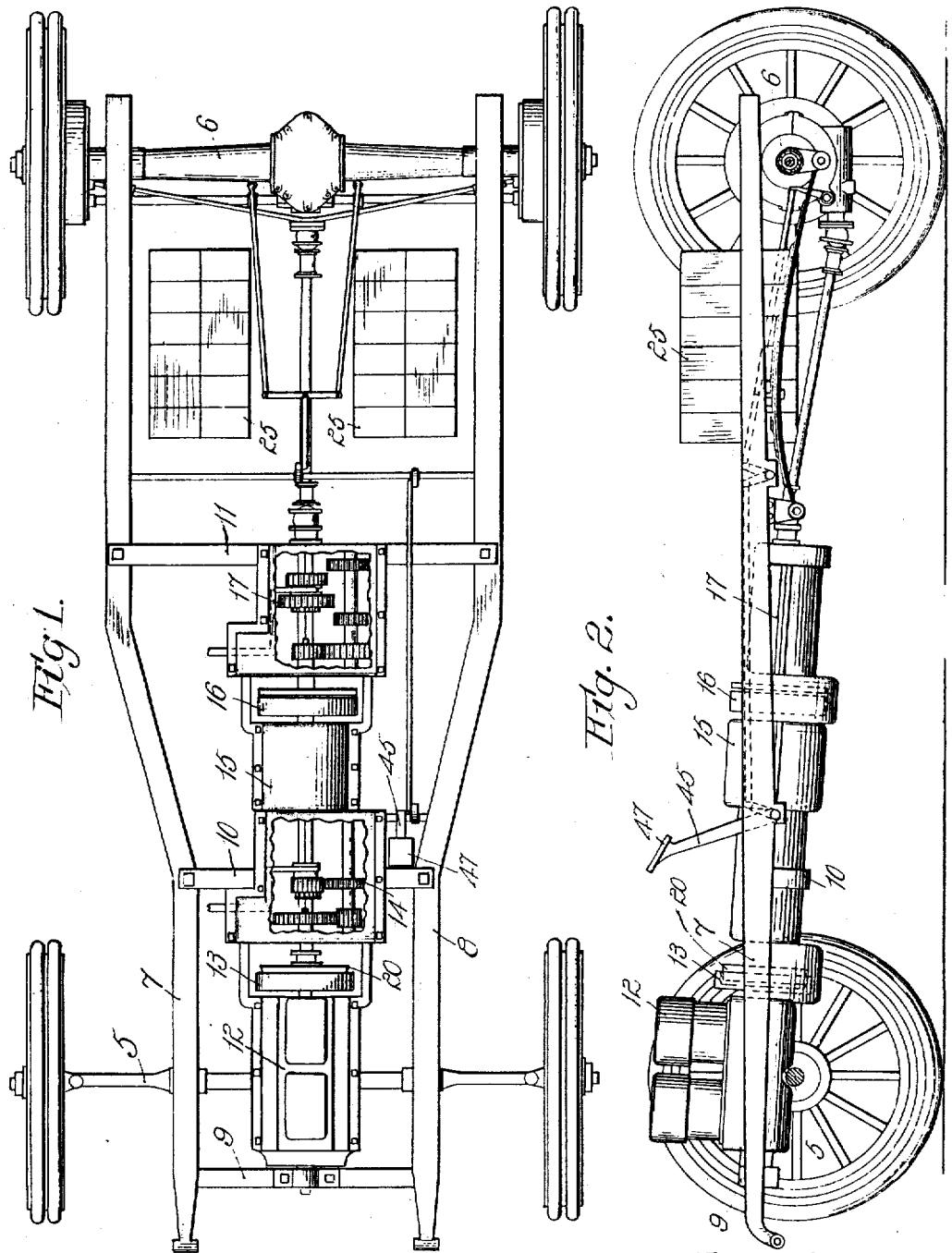

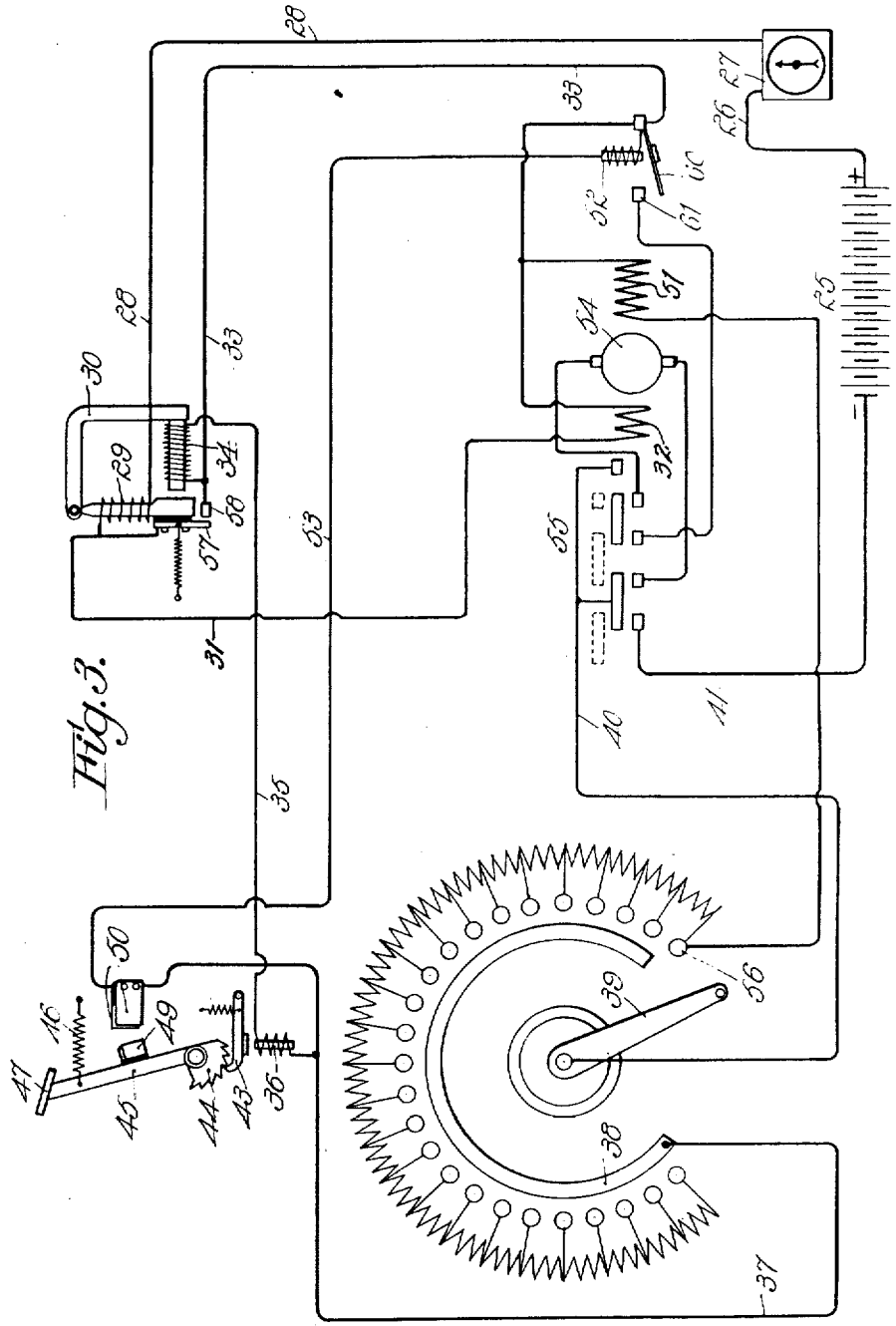

ROLAND S. FEND, OF CHICAGO, ILLINOIS, ASSIGNOR TO WOODS MOTOR VEHICLE COMPANY, OF CHICAGO, ILLINOIS, A CORPORATION OF ILLINOIS.

AUTOMOBILE.

1,303,870. Specification of Letters Patent. Patented May 20, 1919.

Application filed June 26, 1915. Serial No. 36,593.

*To all whom it may concern:*

Be it known that I, ROLAND S. FEND, a citizen of the United States, residing at Chicago, in the county of Cook and State of Illinois, have invented certain new and useful Improvements in Automobiles, of which the following is a full, clear, concise, and exact description, reference being had to the accompanying drawings, forming a part of this specification.

My invention relates to automobiles of the type provided with a gasolene engine and an assisting electric dynamo, together with clutch and gear shift mechanism whereby the relative speeds of the gasolene engine and electric dynamo may be so adjusted as to throw any proportion of the required power upon either of the units.

Vehicles of this type driven only by electric motors must be provided with storage batteries which are very large and cumbersome and which have so great weight that the chassis must be specially constructed to withstand the strain. This great weight which must be carried by the motor vehicle makes necessary other increases in weight such as a large electric motor capable of driving the vehicle at desired speed, and heavy and expensive frame and tire construction.

Gasolene driven vehicles have in the past been provided with large engines capable of producing many times the power necessary for ordinary level road, constant speed driving, this heavy engine being necessary to facilitate rapid acceleration and rapid hill climbing.

I have conceived and produced a motor vehicle combining the gasolene engine and the electric dynamo into a power unit whereby the size and capacity of the storage battery and the weight thereof are so reduced that its carriage no longer forms a difficult problem.

The electric dynamo which I prefer to use with this vehicle is somewhat smaller than the motor which has been necessary in purely electric vehicles heretofore in general use, and the gasolene engine likewise may be much smaller than the engines which have heretofore been in use in purely gasolene automobiles. I prefer to provide a gasolene engine which is somewhat greater in power than the electric dynamo and I desire that the combined power of the two shall be substantially equal to the power which is ordinarily provided in gasolene driven automobiles of the size and speed capacity of the one herein illustrated.

It is well known that the life of a storage battery may be greatly prolonged if it is not discharged below a solution density of 1200, nor charged above a solution density of 1250, except for an occasional overcharge which has been found to be advantageous. In order that the storage battery may be either charged or discharged at any car speed, that is, in order that the dynamo when driven as a generator may be run at the proper speed to charge the battery at the desired rate, I have provided a change gear device between the gasolene engine and the dynamo, and also have provided a change gear mechanism between the dynamo and the driven axle. By this arrangement not only am I able to operate my gasolene engine at its most efficient speed for any desirable car speed, but I am able at the same time to drive my dynamo at any desired speed, so that it may either be used efficiently as a motor or as a generator as the state of the storage battery and road conditions require.

It is well known that the control of purely electric vehicles of the present day, which are almost universally provided with series motors, is very simple, so far as the operator is concerned, but that elaborate controlling mechanism capable of switching and interrupting large armature and field currents must be provided in order that the necessary speed and torque may be obtained. It is one of the objects of my invention to simplify the electric circuits so that more inexpensive apparatus may be provided, all of which will be more clearly pointed out in the following detailed description.

My invention is illustrated in the accompanying drawings in which like characters represent like parts throughout the several views, and in which—

Figure 1 is a plan of the chassis showing the disposition of the elements of the power unit thereon.

Figure 2 is an elevation of the chassis with parts removed to more clearly show the location of the power elements; and Fig. 3 is a diagram of the circuit for controlling the motor generator.

Referring more particularly to Figs. 1 and 2, the chassis therein illustrated comprises the front axle 5, rear axle housing 6, and a frame suitably supported thereon constructed in any well known manner, here illustrated as comprising main channels 7 and 8 and transverse members 9, 10 and 11 upon which the gasolene dynamo 12, cone clutch 13, gear shift 14, dynamo 15, magnetic clutch 16, and gear shift 17, are suitably supported, preferably in a housing, the lower half of which is a unitary structure, though it is to be understood it may be suitably articulated if desired. The pan portion of the clutch 13 is carried directly upon the engine crank shaft and serves as a fly wheel for the engine. The cone 20 for the clutch 13 may be moved into and out of contact with the pan by any suitable lever mechanism, not herein illustrated. The gear shift mechanism 14 is preferably constructed so as to drive the dynamo either at the same speed, or at twice the speed, of the gasolene engine, its purpose being to bring about the most efficient operation of both the engine and dynamo under the different conditions which arise in the use of the machine, that is, if an efficient arrangement for rapid charging is desired the generator may be driven at twice engine speed, whereas if the engine and dynamo are expected to work in tandem to drive the car at a high speed it will be found more efficient to drive them at the same speed. Obviously, a further gear shift may be interposed which will make it possible to drive the dynamo at a still greater speed if desired.

Under ordinary running conditions the gear shift mechanism 14 and the clutch 13 will not be shifted, the entire speed control being obtained by the control of the dynamo 15, electro-magnetic clutch 16, and gear shift mechanism 17.

Although the storage battery 22 is herein illustrated without supporting means it is to be understood that this will preferably rest upon the body structure, not illustrated, and that this storage battery which may be much smaller than that ordinarily provided for electric vehicles may be placed in any convenient position in the body structure.

The circuit arrangement shown in Fig. 3 comprises a main battery 25, the positive pole of which is connected through conductor 26, ampere hour meter 27, conductor 28, series coil 29 of the electro-magnetic relay device 30, conductor 31, series dynamo coils 32, conductor 33, coil 34 of the electro-magnetic device 30, conductor 35, coil of electro-magnet 36, conductor 37, segment 38, rheostat arm 39, and conductors 40 and 41 to the negative pole of the main battery 25. By the movement of the rheostat arm 39 into contact with the segment 38 the circuit just described is completed causing the energization of electro-magnets 34 and 36. The energization of electro-magnet 36 withdraws the pawl 43 from the ratchet 44, which constitutes a control over the movement of the foot brake lever 45 and permits that lever to move to an erect position under the influence of spring 46, either immediately, or upon the removal of foot pressure from the pedal 47. The energization of the electro-magnet 34 causes the armature which constitutes the core of electro-magnet 29 to be attracted, thus completing a shunt about the series turns 32 which are wound upon the field magnets of the dynamo.

Substantially simultaneously with the connection between the lever 39 and segment 38 a connection is established between contact button 56 of the rheostat and the lever 39, thus energizing the shunt field turns 51 and strongly magnetizing the field poles of the motor.

When the foot pedal 47 is released so that the metallic block 49 carried thereon makes connection between the plates 50 a circuit is completed from the positive poles of main battery 25 through conductor 26, ampere hour meter 27, conductor 28, series coil 29 of the electro-magnetic structure 30, conductor 31, series dynamo coils 32, conductor 33, coil of electro-magnet 52, conductor 53, plates 50 and metallic block 49, conductor 37, segment 38, rheostat arm 39, conductors 40 and 41 to the negative pole of main battery 25. The current in this path energizes the electro-magnet 52 which attracts its armature and closes the circuit through the dynamo armature 54 and through the commutator switch 55, the function of which is to control the direction of current through the armature 54 to cause the dynamo to rotate in either a forward or reverse direction. The current in this latter path is of considerable volume and initially flows from the positive pole of battery 25 through conductor 26, ampere hour meter 27, conductor 28, series coil 29 of the electro-magnetic device 30, the now closed switch contacts 57 and 58 of the electro-magnetic device 30, conductor 33, switch contacts 60 and 61 of the electro-magnetic relay device 52, armature 54 of the dynamo, and conductor 41 to the negative pole of battery 25. The current which thus flows through the electro-magnet 29 is in the proper direction to neutralize the attraction between the core of coil 29 and the core of coil 34 which neutralizing effect causes the switch contacts 57 and 58 to be immediately separated, thus requiring the current to pass through the series motor coils 32. The current flow through these series coils is in the proper direction to assist in the magnetizing of the motor field whereby an extremely high saturated field is secured for starting and low speed purposes.

As the lever 39 of the rheostat is moved from button to button the magnetizing effect of the shunt coils is decreased and the dynamo speed is consequently increased. The motor is so compounded, however, that is, the proportion of series and shunt windings is such that with the lever 39 of the rheostat rotated to its last position, that is, the position in which all of the resistance is included in series with the shunt field coils, the dynamo operates with substantially the characteristics of a series wound motor.

When it is desired to operate the dynamo as a generator for recharging the storage battery it is only necessary to so increase the dynamo speed by means of the gasolene engine that the electro-motive force generated in the armature of the dynamo will be greater than that of the storage battery. The speed at which this will occur depends entirely upon the degree of magnetization of the dynamo field. The motor will, therefore, be transformed into a generator at a lower speed when the lever 39 rests upon contact 56 than it will when the lever 39 rests upon any other contact of the rheostat. At the moment the electro-motive force generated by the armature reaches that of the battery, or even perhaps slightly ahead of that moment, the magnetization of the coil 34 of electro-magnetic device 30 causes an attraction of the core of coil 39 bringing together switch contacts 57 and 58, thus shunting out the series field windings 32 with the result that when the current is reversed by reason of the electro-motive force of the armature being greater than that of the battery no current will flow through the series coils in the reverse direction which would otherwise act to buck down the field magnetization and interfere with the operation of the dynamo as a generator.

The arrangement heretofore described makes the control of my vehicle very simple, the engine being preferably provided with automatic spark advances so that only two control levers are necessary, one for opening and closing the throttle of the gasolene engine, and the other for moving the lever 39 over the rheostat contacts. For any setting of the lever 39 there is a speed at which the dynamo will be converted into a generator. At or about the speed at which the dynamo is converted into a generator the dynamo will serve to maintain a substantially constant vehicle speed without changing either the gas or motor levers, that is, when a hill or rough roads are encountered and the vehicle speed is decreased thereby the electric dynamo if theretofore operating as a generator will be immediately and automatically converted into an electric motor operating to assist the engine and to maintain the speed of the vehicle only slightly below that at which it was operating before the hill or bad road was encountered. Obviously, by means of the two gear shift arrangements, that is, one between the engine and the dynamo and the other between the dynamo and the propeller shaft, it is possible under any car speed to operate both the engine and the dynamo at speeds which will cause them to give the performance which the battery at that time requires, that is, if there is to be shortly an excessive draft upon the battery it is best to charge the battery in preparation for that emergency and this can best be accomplished with the type of dynamo herein described by propelling both the engine and the dynamo at their most efficient speeds.

Although I have shown and described my invention with reference to a specific modification it is to be understood that certain variations thereof may be made without departing from the spirit or scope of my invention.

Having thus described my invention, what I claim as new and desire to secure by Letters Patent of the United States is:

1. A motor vehicle and driving means therefor, including a gasolene engine, a clutch, a ratio changing gear mechanism, an electric dynamo, a second clutch, a second positive drive ratio changing gear mechanism, a propeller shaft, and a driving axle, arranged in the order named from the front to the rear of the vehicle, and a storage battery for driving the dynamo and vehicle, together with circuit arrangements whereby said battery will be charged by said dynamo when the latter is operated as a generator from the power of said engine, and whereby the speed of the gasolene engine and the dynamo may each be varied for different speeds of the vehicle.

2. In a motor vehicle, the combination with an electric dynamo having a shunt field coil, a brake lever for the vehicle and means controlled thereby for closing the armature circuit of said dynamo when the brake lever is in its non-braking position, a hand operated switch for closing the shunt field circuit of said dynamo, and electro-magnetic means actuating to release said brake lever mechanism from its braking position only after the shunt field circuit has been closed whereby the field circuit of the dynamo will always be closed in advance of the armature circuit.

In witness whereof, I hereunto subscribe my name this 18th day of June, A. D. 1915.

ROLAND S. FEND.

Witnesses:
THOMAS CLEMENT.
W. B. KENNEDY.